United States Patent
Lee

(10) Patent No.: US 9,036,258 B2
(45) Date of Patent: May 19, 2015

(54) DISPLAY METHOD OF A TWO-DIMENSIONAL AND NAKED EYE TYPE STEREOSCOPIC SWITCHABLE DISPLAY DEVICE

(71) Applicant: HANNSTAR DISPLAY CORP., New Taipei (TW)

(72) Inventor: Chih-Hsuan Lee, Tainan (TW)

(73) Assignee: HANNSTAR DISPLAY CORPORATION, Wugu Dist., New Taipei (TW)

( * ) Notice: Subject to any disclaimer, the term of this patent is extended or adjusted under 35 U.S.C. 154(b) by 187 days.

(21) Appl. No.: 13/802,793

(22) Filed: Mar. 14, 2013

(65) Prior Publication Data

US 2014/0098417 A1 Apr. 10, 2014

(30) Foreign Application Priority Data

Oct. 9, 2012 (CN) .......................... 2012 1 0380698

(51) Int. Cl.
*G02B 27/22* (2006.01)
*G02B 27/00* (2006.01)

(52) U.S. Cl.
CPC ........ *G02B 27/0093* (2013.01); *G02B 27/2214* (2013.01)

(58) Field of Classification Search
None
See application file for complete search history.

(56) References Cited

U.S. PATENT DOCUMENTS

| 2007/0258139 | A1 | 11/2007 | Tsai |
| 2008/0266387 | A1 | 10/2008 | Krijn |
| 2009/0225244 | A1 | 9/2009 | Wang |
| 2010/0007582 | A1* | 1/2010 | Zalewski .......................... 345/8 |
| 2010/0073467 | A1 | 3/2010 | Nam |
| 2011/0051239 | A1 | 3/2011 | Daiku |
| 2011/0304616 | A1 | 12/2011 | Ham |
| 2011/0304783 | A1 | 12/2011 | Park |

FOREIGN PATENT DOCUMENTS

| TW | I292833 | 1/2008 |
| TW | 200938877 | 9/2009 |
| TW | 201120479 | 6/2011 |
| TW | 201211654 | 3/2012 |
| WO | 2011145045 | 11/2011 |

* cited by examiner

*Primary Examiner* — Jade R Chwasz
(74) *Attorney, Agent, or Firm* — Winston Hsu; Scott Margo

(57) ABSTRACT

A display method of a two-dimensional and naked eye type stereoscopic switchable display device is disclosed. The two-dimensional and naked eye type stereoscopic switchable display device includes a two-dimensional and naked eye type stereoscopic switchable display module, at least one detection device and an indicator device. The two-dimensional and naked eye type stereoscopic switchable display module provides a plurality of stereoscopic image regions in a naked eye type stereoscopic display mode. Then, detect a viewer's position with the detection device. And, determine whether or not the viewer's position is in the stereoscopic image regions with the two-dimensional and naked eye type stereoscopic switchable display device. When the viewer locates in the stereoscopic image regions, the indicator device emits a first color light. When the viewer locates outside of the stereoscopic image regions, the indicator device emits a second color light.

7 Claims, 9 Drawing Sheets

DISPLAY METHOD OF A TWO-DIMENSIONAL AND NAKED EYE TYPE STEREOSCOPIC SWITCHABLE DISPLAY DEVICE

BACKGROUND OF THE INVENTION

1. Field of the Invention

The present invention relates to a display method of a two-dimensional and naked eye type stereoscopic switchable display device, and more particularly, the display method of a two-dimensional and naked eye type stereoscopic switchable display device showing a viewer whether or not his position is in the stereoscopic image regions.

2. Description of the Prior Art

As monitor related technologies have progressed in recent years, stereoscopic display technologies and related applications have also developed flourishingly. The principle of the stereoscopic display technology includes delivering different images respectively to a left eye and a right eye of a viewer to give to the viewer a feeling of gradation and depth in the images, thereby generating the stereoscopic effect in the cerebrum of the viewer by analyzing and overlapping the images received separately by the left eye and the right eye.

In general, the conventional stereoscopic display technologies may be substantially divided into two major types, which are the glasses type and the naked eye type (auto stereoscopic type). However, the glasses may cause inconvenience when the glasses type stereoscopic display device is being used. Without the requirement of wearing the glasses, therefore, the naked eye type stereoscopic display device becomes popular in industry.

The conventional naked eye type stereoscopic display device includes a display panel and a parallax barrier. A left eye image and a right eye image are displayed on the display panel, and then are separated by passing through the parallax barrier. Then, the left eye image and the right eye image are emitted toward the left eye and the right eye of the viewer at the different angles respectively. Therefore, the stereoscopic image is displayed. However, there are a plurality of left eye image regions and a plurality of right eye image regions alternately arranged in the three-dimensional space, thereby preventing the viewer from seeing the stereoscopic image at all perspectives and positions. Moreover, if the left eye image and the right eye image are not respectively delivered to the left eye and the right eye of the viewer exactly and properly, the viewer may feel uncomfortable or dizzy.

Accordingly, a display method, which also determines whether or not the viewer's position is in the stereoscopic image regions, is a main objective in the field.

SUMMARY OF THE INVENTION

It is one of the objectives of the invention to provide a display method of a two-dimensional and naked eye type stereoscopic switchable display device, which prevents the viewer from having uncomfortable viewing experiences or headaches.

To achieve the purposes described above, an embodiment of the invention provides a display method of a two-dimensional and naked eye type stereoscopic switchable display device. First, a two-dimensional and naked eye type stereoscopic switchable display device is provided. The two-dimensional and naked eye type stereoscopic switchable display device includes a two-dimensional and naked eye type stereoscopic switchable display module, at least one detection device and an indicator device. The two-dimensional and naked eye type stereoscopic switchable display module provides a plurality of stereoscopic image regions in a naked eye type stereoscopic display mode. Then, a viewer's position is detected with the detection device. Whether or not the viewer's position is in the stereoscopic image regions is determined with the two-dimensional and naked eye type stereoscopic switchable display device. When the viewer locates in the stereoscopic image regions, the indicator device emits a first color light. When the viewer locates outside of the stereoscopic image regions, the indicator device emits a second color light.

In the display method of the two-dimensional and naked eye type stereoscopic switchable display device in the present invention, the detection device recognizes the viewer's position. Then, the viewer can assure himself whether his position is in the stereoscopic image regions or outside of the stereoscopic image regions with the instruction of the indicator device. Moreover, the viewer can move his position with this information to get rid of dizziness or headaches.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, the embodiments will be made in detail. The embodiments of the present invention are illustrated in the accompanying drawings with numbered elements. In addition, the terms such as "first" and "second" described in the present invention are used to distinguish different components or processes, which do not limit the sequence of the components or processes.

Figure 1:
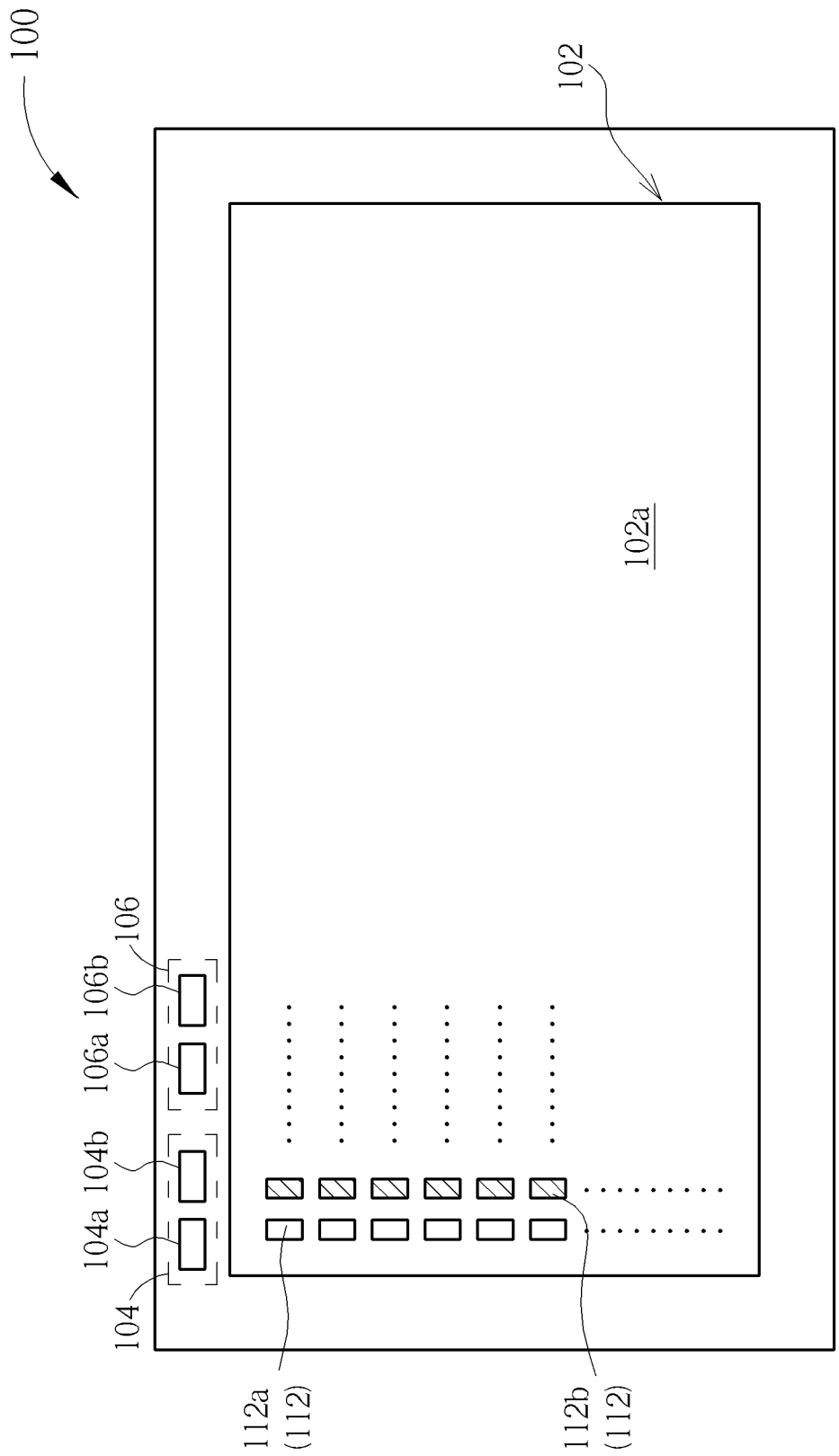
FIG. 1 is a schematic diagram illustrating a two-dimensional and naked eye type stereoscopic switchable display device according to a first embodiment of the present invention.

Please refer to FIG. 1 that is a schematic diagram illustrating a two-dimensional and naked eye type stereoscopic switchable display device according to a first embodiment of the present invention. As shown in FIG. 1, the two-dimensional and naked eye type stereoscopic switchable display device 100 includes a two-dimensional and naked eye type stereoscopic switchable display module 102, at least one detection device 104 and an indicator device 106. The two-dimensional and naked eye type stereoscopic switchable display module 102 has a display surface 102*a*. A two-dimensional image is displayed on the display surface 102*a* of the two-dimensional and naked eye type stereoscopic switchable display module 102 in the two-dimensional display mode. A stereoscopic image is displayed on the display surface 102*a* of the two-dimensional and naked eye type stereoscopic switchable display module 102 in the naked eye type stereoscopic display mode. The detection device 104 is used to track a viewer who watches the image on the two-dimensional and naked eye type stereoscopic switchable display device 100, thereby determining whether to display the stereoscopic image on the two-dimensional and naked eye type stereoscopic switchable display device 100. The indicator device 106 is used to output indicator signals, for example, by emitting colorful light, so that the viewer can know the result evaluated by the detection device 104 according to the indicator signals. For example, the detection device 104 may include a distance detector 104*a* and a planar position detector 104*b*. The distance detector 104*a*, such as a proximity sensor, is used to sense the distance between the viewer and the two-dimensional and naked eye type stereoscopic switchable display device 100. The planar position detector 104*b*, such as a charge-coupled device (CCD), is used to sense the position of the viewer on a plane parallel to the display surface 102*a* of the two-dimensional and naked eye type stereoscopic switchable display device 100. The detection device 104 is not limited to the combination of a single distance detector and a single planar position detector, but the detection device 104 may include other kinds of detectors, a plurality of distance detectors or a plurality of planar position detectors. The indicator device 106 may include a first light-emitting diode 106*a* and a second light-emitting diode 106*b*. The first light-emitting diode 106*a* is used to emit a first color light, such as green light. The second light-emitting diode 106*b* is used to emit a second color light, such as red light. The indicator device 106 is not limited to the combination of a single first light-emitting diode and a single second light-emitting diode, but the indicator device 106 may include a plurality of first light-emitting diodes, a plurality of second light-emitting diodes, or other kinds of light-emitting diodes, which emit colorful light different from the first color light and the second color light. Moreover, the two-dimensional and naked eye type stereoscopic switchable display device 100 of the present invention may also include a control device. The control device is used to compare the result detected by the detection device 104 and the stored data, which are about the locations of the stereoscopic image regions, in the control device in order to determine whether to display the stereoscopic image.

Figure 2:
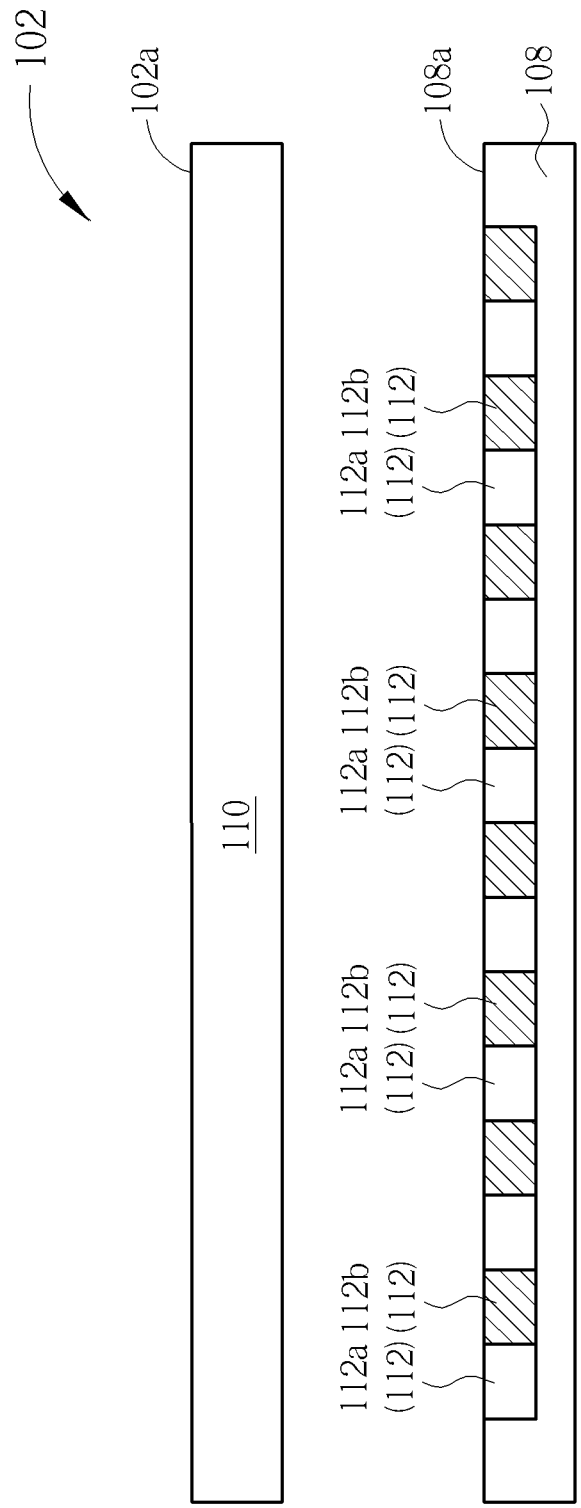
FIG. 2 is a schematic diagram illustrating the two-dimensional and naked eye type stereoscopic switchable display module according to the first embodiment of the present invention.
Figure 3:
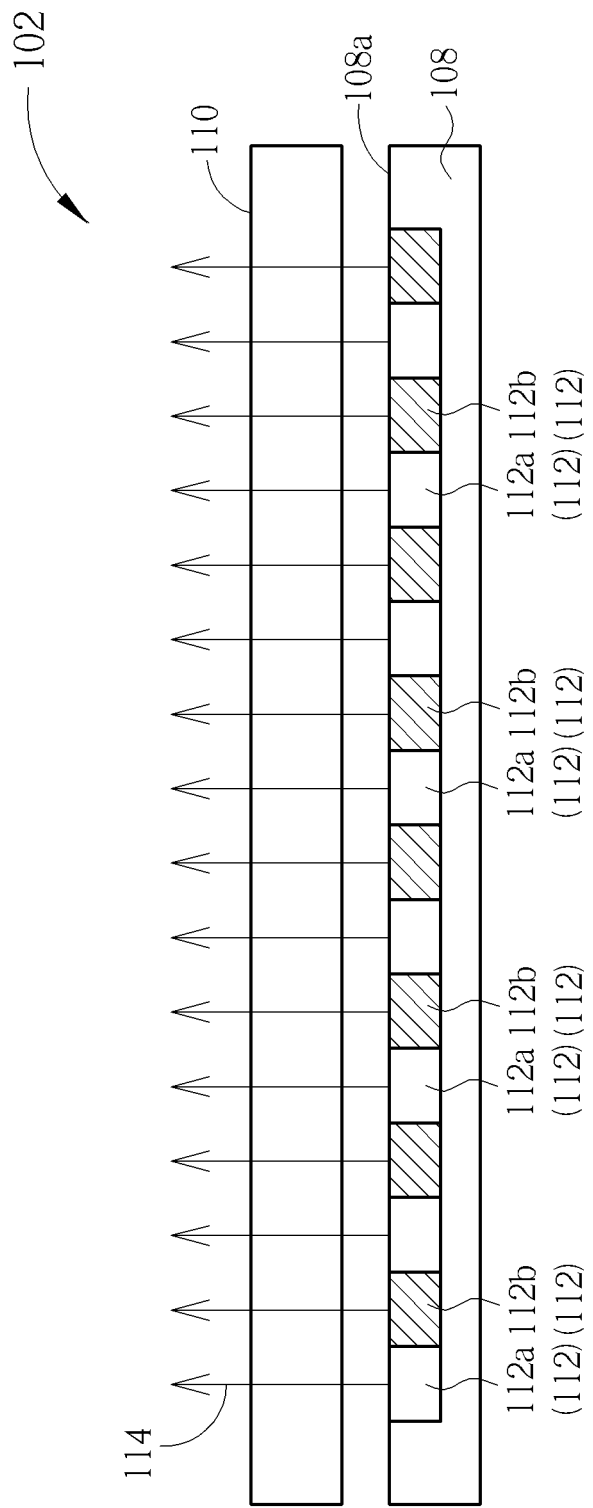
FIG. 3 is a schematic diagram illustrating how the two-dimensional and naked eye type stereoscopic switchable display module displays the two-dimensional image according to the first embodiment of the present invention.
Figure 4:
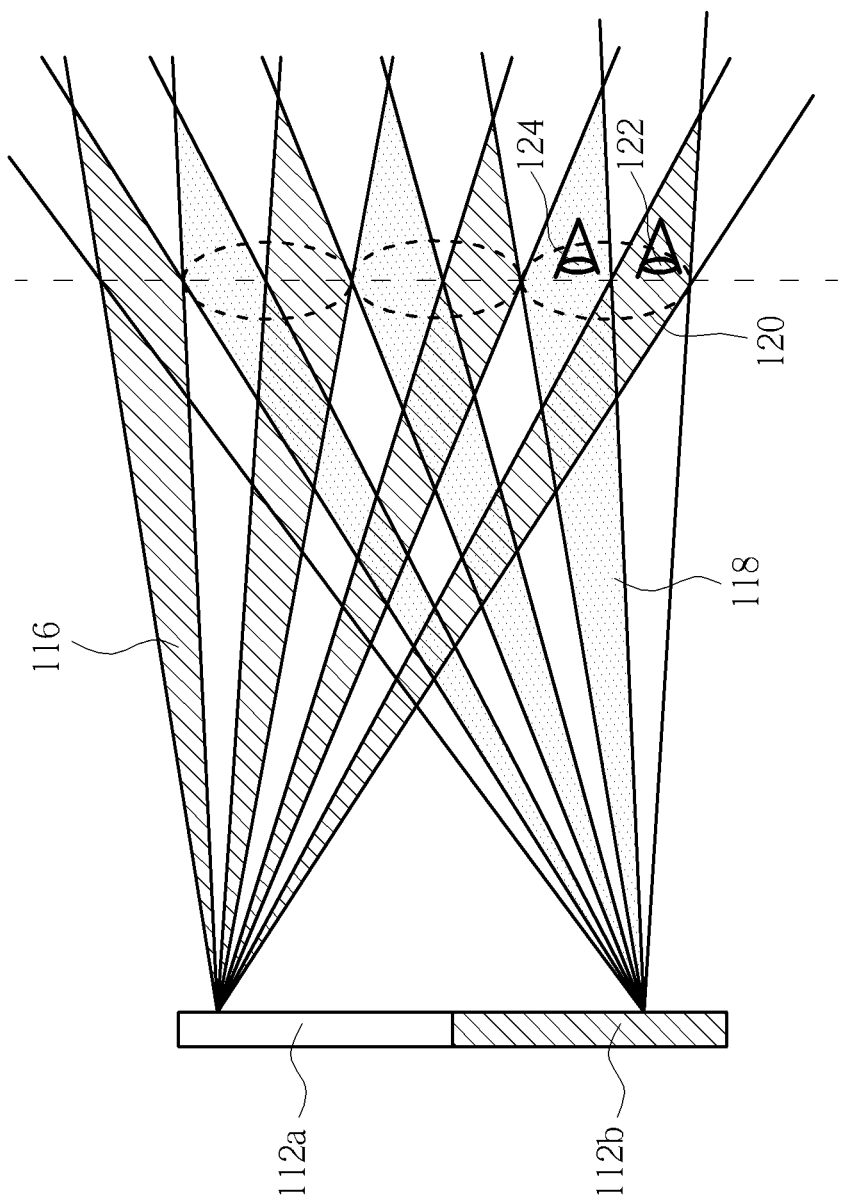
FIG. 4 is a schematic diagram illustrating stereoscopic image regions generated by a single left eye pixel and a single right eye pixel of the two-dimensional and naked eye type stereoscopic switchable display module according to the first embodiment of the present invention.

The two-dimensional and naked eye type stereoscopic switchable display module in this embodiment will be further illustrated as follows. Please refer to FIGS. 2-4, and also refer to FIGS. 1. FIG. 2 is a schematic diagram illustrating the two-dimensional and naked eye type stereoscopic switchable display module according to the first embodiment of the present invention. FIG. 3 is a schematic diagram illustrating how the two-dimensional and naked eye type stereoscopic switchable display module displays the two-dimensional image according to the first embodiment of the present invention. FIG. 4 is a schematic diagram illustrating stereoscopic image regions generated by a single left eye pixel and a single right eye pixel of the two-dimensional and naked eye type stereoscopic switchable display module. As shown in FIGS. 1-2, the two-dimensional and naked eye type stereoscopic switchable display module 102 in this embodiment is a parallax barrier display module. The two-dimensional and naked eye type stereoscopic switchable display module 102 includes a display panel 108 and an active parallax barrier 110. The display panel 108 includes a plurality of pixels 112 arranged in an array. The pixels 112 can be divided into a plurality of left eye pixels 112*a* and a plurality of right eye pixels 112*b*. Either the left eye pixels 112*a* or the right eye pixels 112*b* are aligned in a row, and each of the left eye pixels 112*a* and each of the right eye pixels 112*b* are alternately aligned along a column direction in sequence. The active parallax barrier 110 is disposed on the display surface 108*a* of the display panel 108. When the active parallax barrier 110 is turned on, a shielding pattern is displayed on the active parallax barrier 110. When the active parallax barrier 110 is turned off, the active parallax barrier 110 is transparent. However, the present invention is not limited to this—the shielding pattern may be displayed on the active parallax barrier 110 when the active parallax barrier 110 is turned off, and the active parallax barrier 110 is transparent when the active parallax barrier 110 is turned on. The active parallax barrier 110 in this embodiment may be a liquid crystal display panel, but not limited thereto. As shown in FIG. 3, when the two-dimensional and naked eye type stereoscopic switchable display module 102 is in the two-dimensional display mode, the active parallax barrier 110 is turned off. At the same time, a two-dimensional image 114 is displayed on the pixels 112 (i.e., the left eye pixels 112*a* and the right eye pixels 112*b*) of the display panel 108. Moreover, the two-dimensional image 114 may pass through the active parallax barrier 110 so that the two-dimensional image 114 is displayed on the two-dimensional and naked eye type stereoscopic switchable display module 102. As shown in FIG. 4, when the two-dimensional and naked eye type stereoscopic switchable display module 102 is in the naked eye type stereoscopic display mode, the active parallax barrier 110 is turned on. At the same time, a left eye image is displayed on the left eye pixels 112*a* of the display panel 108, and a right eye image is displayed on the right eye pixels 112*b* of the display panel 108. Therefore, a stereoscopic image is displayed. Moreover, the left eye image may pass through the shielding pattern of the active parallax barrier 110, and a plurality of left eye image regions 116 are formed; the right eye image may pass through the shielding pattern of the active parallax barrier 110, and a plurality of right eye image regions 118 are formed. The left eye image regions 116 and the right eye image regions 118 are alternately arranged. The left eye image regions 116 and the right eye image regions 118 therefore constitute a plurality of the stereoscopic image regions 120 in which the stereoscopic image is displayed. In other words, each of the stereoscopic image regions 120 includes one left eye image region 116 and one right eye image region 118. When the viewer locates in the stereoscopic image regions 120, the viewer's left eye 122 is within the left eye image regions 116 and the viewer's right eye 124 is within the right eye image regions 118. Therefore, the viewer sees the stereoscopic image. The two-dimensional and naked eye type stereoscopic switchable display module is not limited to the parallax barrier display module mentioned above, but the two-dimensional and naked eye type stereoscopic switchable display module in a variant embodiment of the present invention may be a lenticular lens display module. In other words, the active parallax barrier may be replaced by an active lenticular lens.

Figure 5:
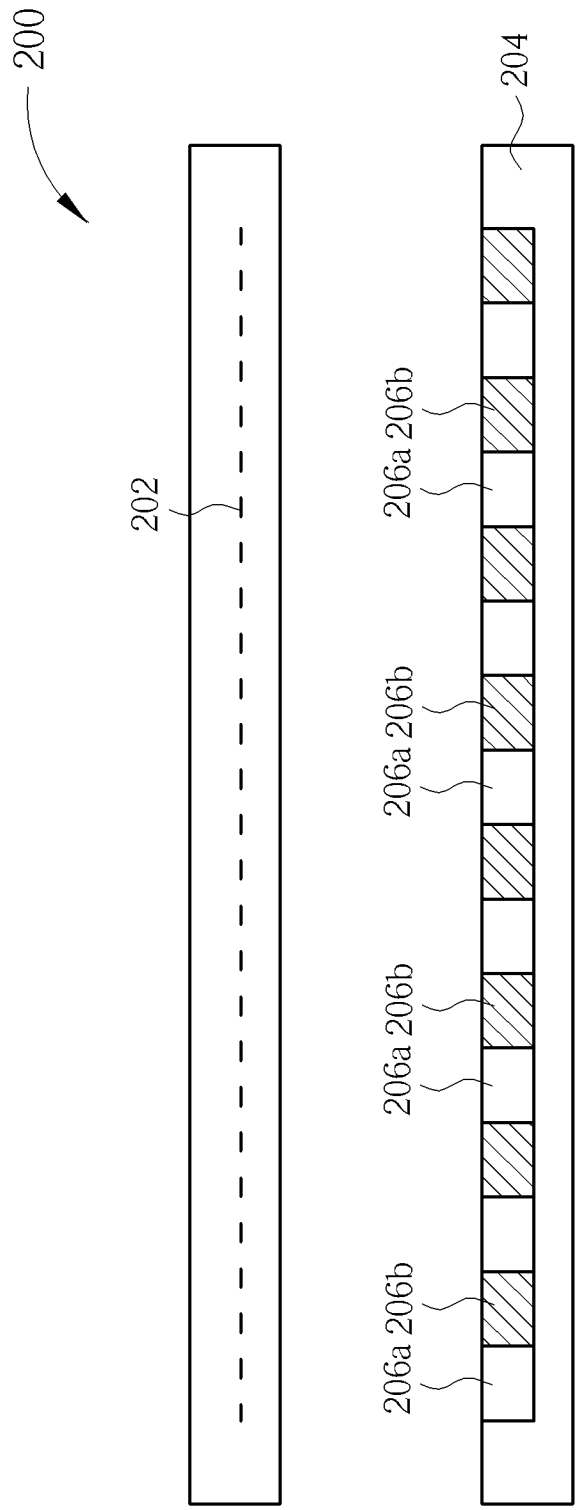
FIG. 5 is a schematic diagram illustrating a two-dimensional and naked eye type stereoscopic switchable display module according to a second embodiment of the present invention.
Figure 6:
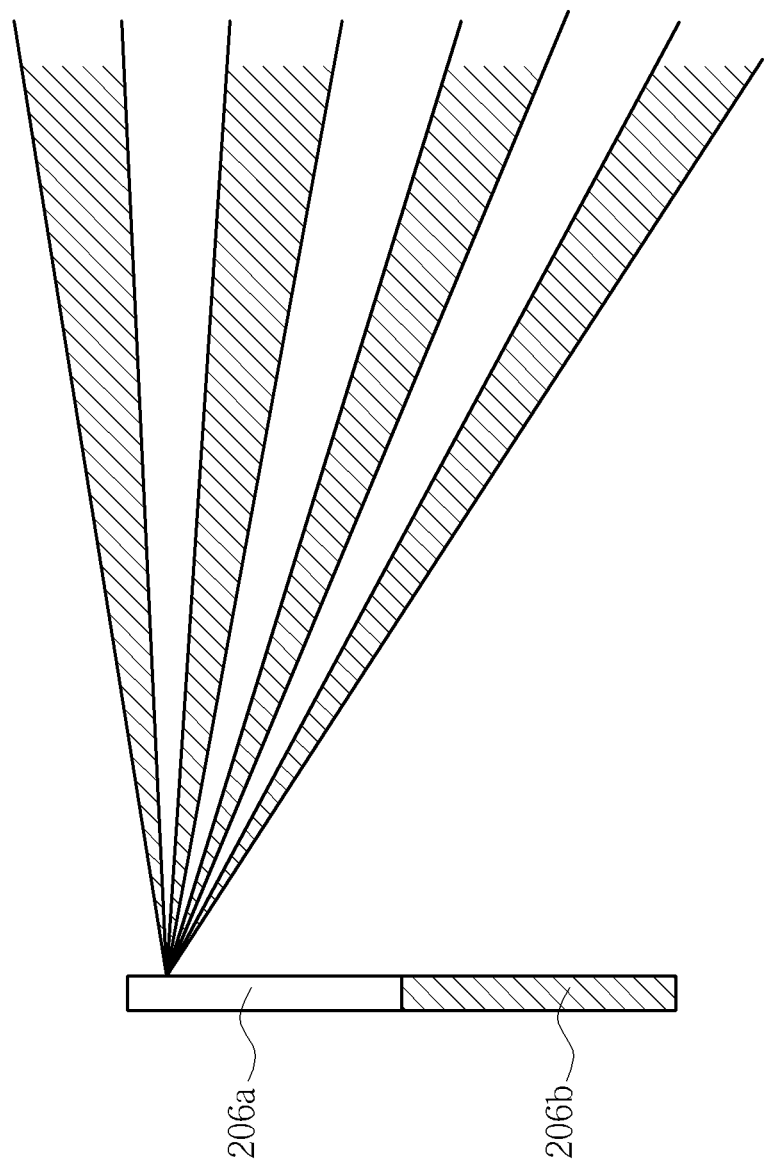
FIGS. 6-7 are schematic diagrams illustrating how the two-dimensional and naked eye type stereoscopic switchable display device displays the two-dimensional image according to the second embodiment of the present invention.
Figure 7:
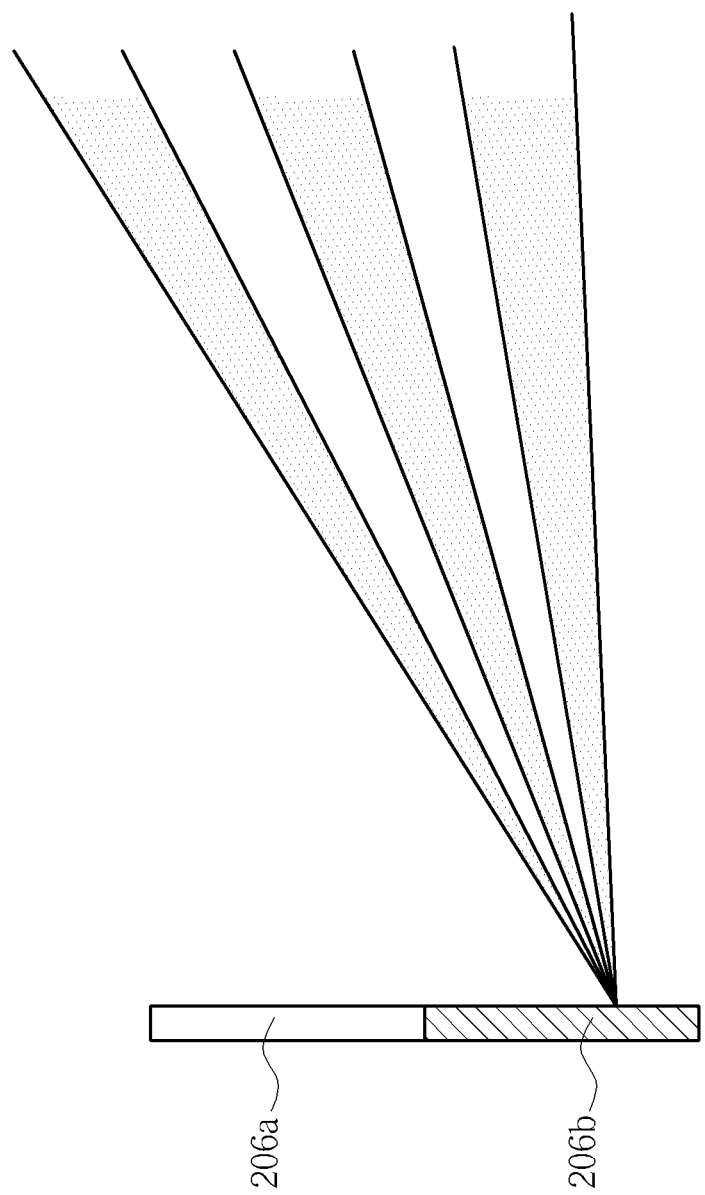

Please refer to FIGS. 5-7, and also refer to FIGS. 4. FIG. 5 is a schematic diagram illustrating a two-dimensional and naked eye type stereoscopic switchable display module according to a second embodiment of the present invention. FIGS. 6-7 are schematic diagrams illustrating how the two-dimensional and naked eye type stereoscopic switchable display device displays the two-dimensional image according to the second embodiment of the present invention. As shown in FIG. 5, compared with the two-dimensional and naked eye type stereoscopic switchable display module in the first embodiment, a fixed parallax barrier 202 is used to display the stereoscopic image on the two-dimensional and naked eye type stereoscopic switchable display module 200 of this embodiment. In other words, the two-dimensional and naked eye type stereoscopic switchable display module 200 includes a display panel 204 and a parallax barrier 202. The parallax barrier 202 can not be transparent, but the parallax barrier 202 can only present a shielding pattern. When the two-dimensional and naked eye type stereoscopic switchable display module 200 is in the naked eye type stereoscopic display mode, a left eye image is displayed on the left eye pixels 206a of the display panel 204 and a right eye image is displayed on the right eye pixels 206b of the display panel 204. Therefore, a stereoscopic image is displayed. As shown in FIG. 4, the parallax barrier 202 in this embodiment has the same function as that of the active parallax barrier 110 in the first embodiment, and the viewer can see the stereoscopic image as well. Furthermore, as shown in FIG. 6, when the two-dimensional and naked eye type stereoscopic switchable display module 200 is in the two-dimensional display mode, the left eye image is displayed on the left eye pixels 206a of the display panel 204 while nothing is displayed on the right eye pixels 206b. Therefore, a two-dimensional image is displayed, and the two-dimensional image displayed is the same as the left eye image. However, the present invention is not limited to this. As shown in FIG. 7, when the two-dimensional and naked eye type stereoscopic switchable display module 200 is in the two-dimensional display mode, the right eye image may be displayed on the right eye pixels 206b of the display panel 204 while nothing is displayed on the left eye pixels 206a of the display panel 204. Therefore, the two-dimensional image is also displayed, and the two-dimensional image displayed is the same as the right eye image. In the variant embodiment in the present invention, the parallax barrier may be replaced by a lenticular lens.

Figure 8:
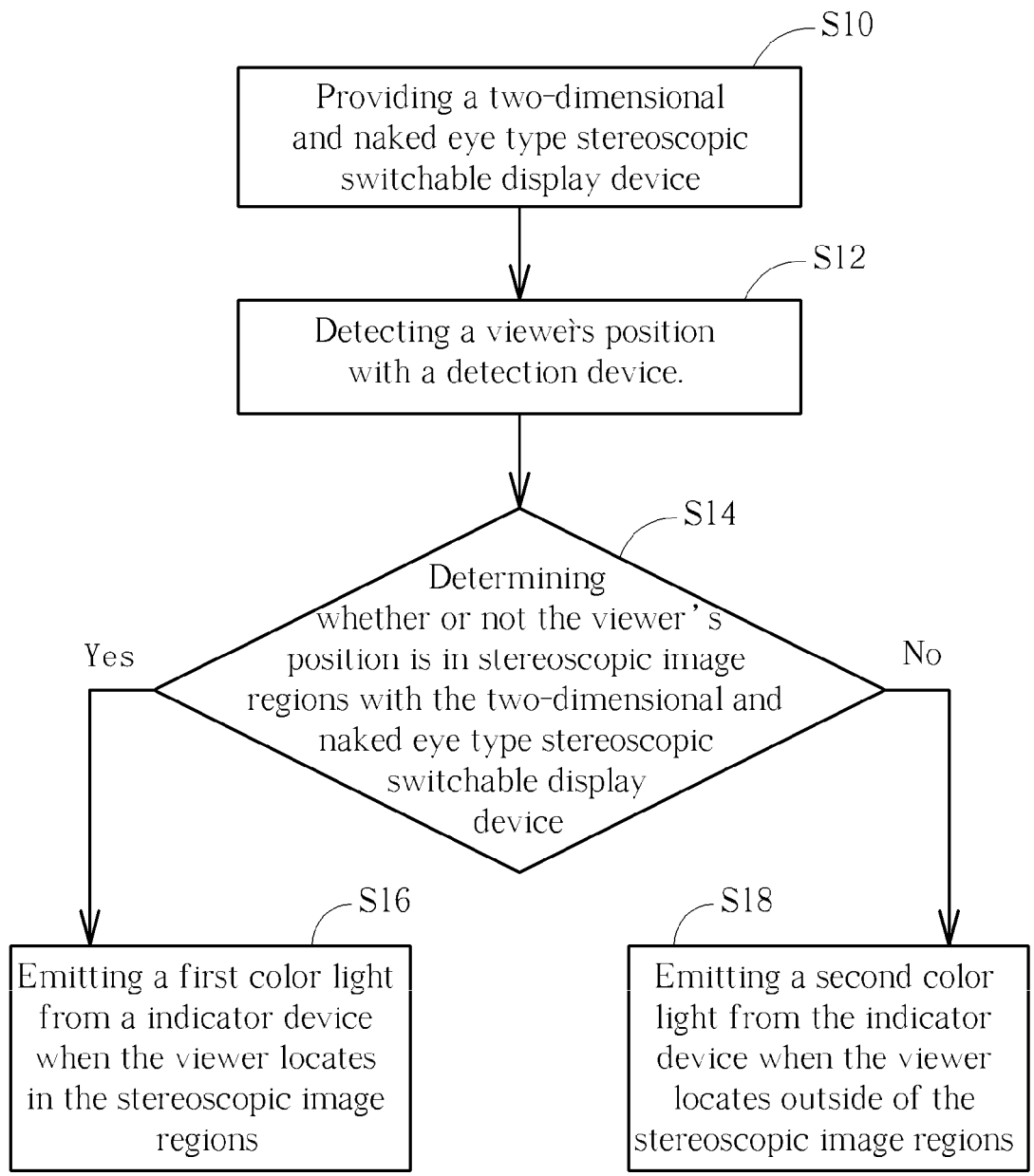
FIG. 8 is a flow schematic diagram illustrating a display method of the two-dimensional and naked eye type stereoscopic switchable display device according to a first embodiment of this invention.

The display method of the two-dimensional and naked eye type stereoscopic switchable display device of the present invention will be further illustrated as follows. Please refer to FIG. 8, and also refer to FIG. 1, FIG. 2 and FIG. 4. FIG. 8 is a flow schematic diagram illustrating a display method of the two-dimensional and naked eye type stereoscopic switchable display device according to a first embodiment of this invention. The display method in this embodiment takes the two-dimensional and naked eye type stereoscopic switchable display device of the preceding first embodiment for example, but not limited thereto. As shown in FIG. 1, FIG. 2, FIG. 4 and FIG. 8, the display methods include the following steps.

Step S10: providing the two-dimensional and naked eye type stereoscopic switchable display device 100.

Step S12: detecting a viewer's position with the detection device 104.

Step S14: determining whether or not the viewer's position is in the stereoscopic image regions 120 with the two-dimensional and naked eye type stereoscopic switchable display device 100—if yes, performing Step S16; otherwise, performing Step S18.

Step S16: emitting the first color light from the indicator device 106 when the viewer locates in the stereoscopic image regions 120.

Step S18: emitting the second color light from the indicator device 106 when the viewer locates outside of the stereoscopic image regions 120.

In Step S10, the two-dimensional and naked eye type stereoscopic switchable display device 100 takes the two-dimensional and naked eye type stereoscopic switchable display device of the preceding first embodiment for example, but the present invention is not limited to this and can be the two-dimensional and naked eye type stereoscopic switchable display device of any embodiment mentioned above. In Step S12, the detection device 104 can sense the distance between the viewer and the two-dimensional and naked eye type stereoscopic switchable display device 100 with the distance detector 104a. The detection device 104 can sense the positions of the viewer's left eye 122 and right eye 124 on a plane parallel to the display surface 102a of the two-dimensional and naked eye type stereoscopic switchable display device 100 with the planar position detector 104b. Therefore, the positions of the viewer's both eyes are recognized in the three-dimensional space. In Step S14, whether or not the viewer's position is in the stereoscopic image regions 120 can be determined with the two-dimensional and naked eye type stereoscopic switchable display device 100 according to the position of the viewer detected by the detection device 104. If the viewer's position is in the stereoscopic image regions 120, Step S16 will be carried out. In Step S16, when the position of the viewer is found to be in the stereoscopic image regions 120 with the two-dimensional and naked eye type stereoscopic switchable display device 100, the indicator device 106 emits the first color light. Therefore, the viewer can assure himself that he is in the stereoscopic image regions 120 according to the first color light. On the other hand, if the viewer's position is outside of the stereoscopic image regions 120, Step S18 will be carried out. In Step S18, when the position of the viewer is found to be outside of the stereoscopic image regions 120 with the two-dimensional and naked eye type stereoscopic switchable display device 100, the indicator device 106 emits the second color light. Therefore, the viewer can assure himself that he is outside of the stereoscopic image regions 120 according to the second color light. Moreover, the viewer can move to the stereoscopic image regions 120 with this information.

Display methods of the two-dimensional and naked eye type stereoscopic switchable display device of the present invention are not restricted to the preceding embodiments. Another feasible display method will be disclosed in the following paragraphs. For brevity purposes, like or similar features in multiple embodiments will be described with similar reference numerals for ease of illustration and description thereof.

Figure 9:
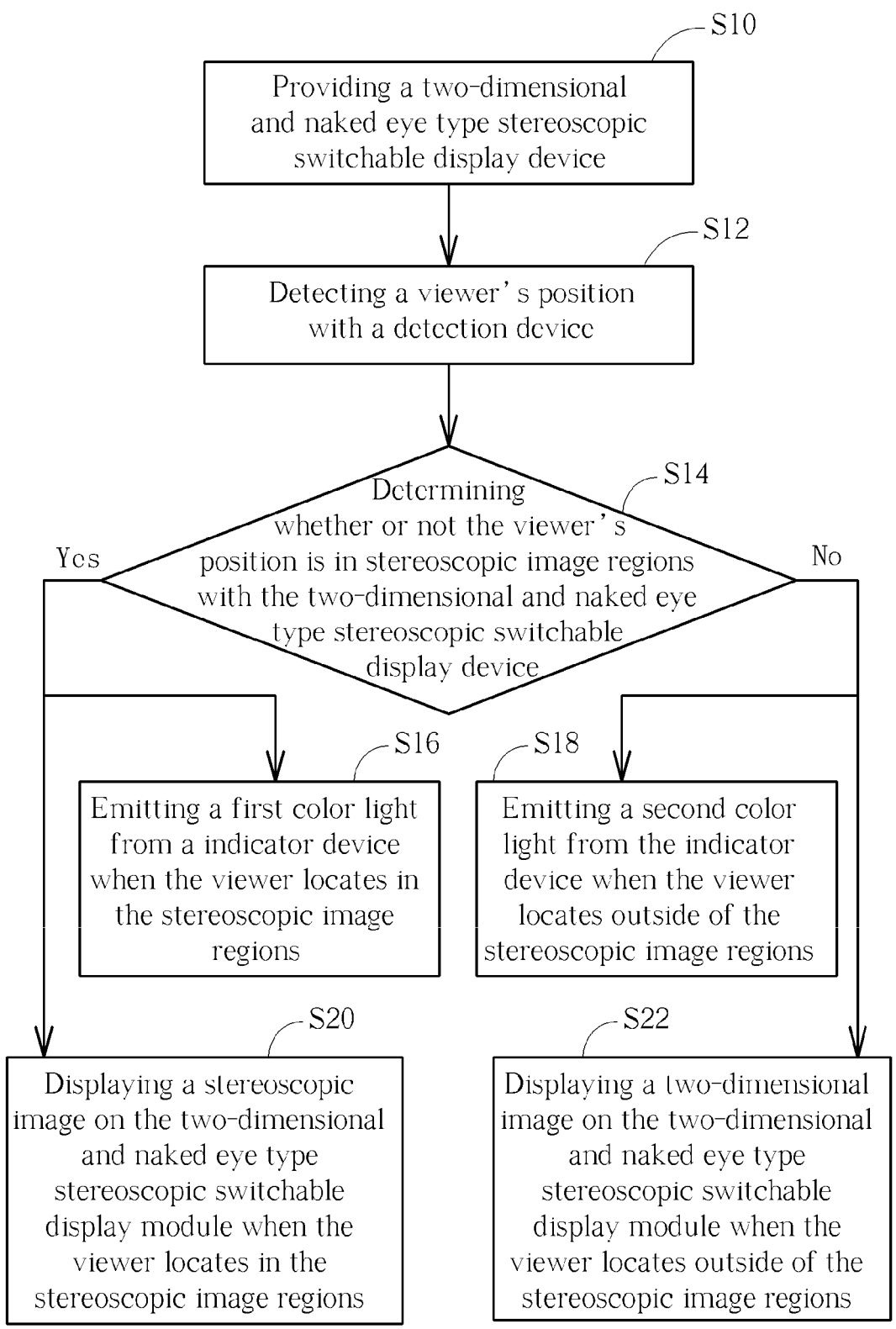
FIG. 9 is a flow schematic diagram illustrating a display method of the two-dimensional and naked eye type stereoscopic switchable display device according to a second embodiment of this invention.

Please refer to FIG. 9, and also refer to FIGS. 1-7. FIG. 9 is a flow schematic diagram illustrating a display method of the two-dimensional and naked eye type stereoscopic switchable display device according to a second embodiment of this invention. The display method takes the two-dimensional and naked eye type stereoscopic switchable display device of the preceding first embodiment for example, but not limited thereto. As shown in FIG. 1, FIG. 2, FIG. 4 and FIG. 9, compared with the first embodiment, the display method of this embodiment includes the following steps (i.e., Step S20 and Step S22) besides the steps from Step S10 to Step S18. Moreover, Step S20 and Step S22 continue from Step S14.

Step S20: displaying a stereoscopic image on the two-dimensional and naked eye type stereoscopic switchable display module 102 when the viewer locates in the stereoscopic image regions 120.

Step S22: displaying a two-dimensional image on the two-dimensional and naked eye type stereoscopic switchable display module 102 when the viewer locates outside of the stereoscopic image regions 120.

If the position of the viewer is in the stereoscopic image regions 120, not only Step S16 but also Step S20 will be carried out. When the position of the viewer is found to be in the stereoscopic image regions 120 with the two-dimensional and naked eye type stereoscopic switchable display device 100 in Step S14, the active parallax barrier 110 is turned on. At the same time, a left eye image is displayed on the left eye pixels 112a of the display panel 108, and a right eye image is displayed on the right eye pixels 112b of the display panel 108. Therefore, the stereoscopic image is displayed, and the viewer sees the stereoscopic image in the stereoscopic image regions 120 as shown in FIG. 4. If the position of the viewer is outside of the stereoscopic image regions 120, not only Step S18 but also Step S22 will be carried out. When the position of the viewer is found to be in the stereoscopic image regions 120 with the two-dimensional and naked eye type stereoscopic switchable display device 100 in Step S14, the active parallax barrier 110 is turned off. At the same time, the two-dimensional image is displayed on the pixels 112 of the display panel 108 as shown in FIG. 3. In a variant embodiment in the present invention, the two-dimensional and naked eye type stereoscopic switchable display device may be the two-dimensional and naked eye type stereoscopic switchable display device 100 in the second embodiment mentioned above. When the position of the viewer is found to be outside of the stereoscopic image regions with the two-dimensional and naked eye type stereoscopic switchable display device, the left eye image is displayed on the left eye pixels of the display panel while nothing is displayed on the right eye pixels of the display panel. Therefore, as shown in FIG. 6, the two-dimensional image is displayed, and the two-dimensional image displayed is the same as the left eye image. Or, the two-dimensional image displayed may be the same as the right eye image as shown in FIG. 7. In this situation, the right eye image is displayed on the right eye pixels of the display panel while nothing is displayed on the left eye pixels of the display panel.

To sum up, in the display method of the two-dimensional and naked eye type stereoscopic switchable display device in the present invention, the detection device recognizes the viewer's position. Then, the viewer can assure himself whether his position is in the stereoscopic image regions or outside of the stereoscopic image regions with the instruction of the indicator device. Moreover, the viewer can move his position with this information to get rid of dizziness or headaches. In the display method of the two-dimensional and naked eye type stereoscopic switchable display device in the present invention, whether the two-dimensional image or the stereoscopic image is displayed depends on the viewer's position, thereby preventing the viewer from having uncomfortable viewing experiences or headaches.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display method of a two-dimensional and naked eye type stereoscopic switchable display device, comprising:
providing the two-dimensional and naked eye type stereoscopic switchable display device, wherein the two-dimensional and naked eye type stereoscopic switchable display device comprises a two-dimensional and naked eye type stereoscopic switchable display module, at least one detection device and an indicator device, wherein the two-dimensional and naked eye type stereoscopic switchable display module provides a plurality of stereoscopic image regions in a naked eye type stereoscopic display mode;
detecting a position of a viewer with the detection device;
determining whether or not the position of the viewer locates in one of the stereoscopic image regions with the two-dimensional and naked eye type stereoscopic switchable display device; and
emitting a first color light from the indicator device and displaying a stereoscopic image on the two-dimensional and naked eye type stereoscopic switchable display module when the viewer locates in the one of the stereoscopic image regions, and emitting a second color light from the indicator device and displaying a two-dimensional image on the two-dimensional and naked eye type stereoscopic switchable display module when the viewer locates outside of the stereoscopic image regions.

2. The display method of the two-dimensional and naked eye type stereoscopic switchable display device according to claim 1, wherein the two-dimensional and naked eye type stereoscopic switchable display module comprises a display panel and a parallax barrier, the display panel comprises a plurality of left eye pixels and a plurality of right eye pixels, and the two-dimensional image is displayed on the left eye pixels or on the right eye pixels.

3. The display method of the two-dimensional and naked eye type stereoscopic switchable display device according to claim 1, wherein the two-dimensional and naked eye type stereoscopic switchable display module comprises a display panel and an active parallax barrier, the display panel comprises a plurality of left eye pixels and a plurality of right eye pixels, the active parallax barrier is turned off when the viewer locates outside of the stereoscopic image regions, and the two-dimensional image is displayed on the left eye pixels and on the right eye pixels.

4. The display method of the two-dimensional and naked eye type stereoscopic switchable display device according to claim 1, wherein the first color light is of green, and the second color light is of red.

5. The display method of the two-dimensional and naked eye type stereoscopic switchable display device according to claim 1, wherein the detection device comprises a distance detector and a planar position detector, the distance detector is used to sense a distance between the viewer and the two-dimensional and naked eye type stereoscopic switchable display module, and the planar position detector is used to sense the position of the viewer on a plane parallel to a display surface of the two-dimensional and naked eye type stereoscopic switchable display module.

6. The display method of the two-dimensional and naked eye type stereoscopic switchable display device according to claim 1, wherein the indicator device comprises a first light-emitting diode and a second light-emitting diode, the first light-emitting diode emits the first color light, and the second light-emitting diode emits the second color light.

7. The display method of the two-dimensional and naked eye type stereoscopic switchable display device according to claim 1, wherein each of the stereoscopic image regions comprises a left eye image region and a right eye image region, wherein when the viewer locates in the one of the stereoscopic image regions, a left eye of the viewer is within the left eye image region of the one of the stereoscopic image regions and the viewer's right eye is within the right eye image region of the one of the stereoscopic image regions.

* * * * *